US011245278B2

(12) United States Patent
Ota et al.

(10) Patent No.: US 11,245,278 B2
(45) Date of Patent: Feb. 8, 2022

(54) SEMICONDUCTOR DEVICE AND BATTERY PACK

(71) Applicant: RENESAS ELECTRONICS CORPORATION, Tokyo (JP)

(72) Inventors: Tsuyoshi Ota, Tokyo (JP); Youhei Kengoyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 157 days.

(21) Appl. No.: 16/815,723

(22) Filed: Mar. 11, 2020

(65) Prior Publication Data

US 2020/0295585 A1    Sep. 17, 2020

(30) Foreign Application Priority Data

Mar. 14, 2019   (JP) .............................. JP2019-047072

(51) Int. Cl.
*H02J 7/00* (2006.01)
*H01M 10/48* (2006.01)
*H01M 10/42* (2006.01)
*H01M 10/44* (2006.01)

(52) U.S. Cl.
CPC ......... *H02J 7/0071* (2020.01); *H01M 10/425* (2013.01); *H01M 10/441* (2013.01); *H01M 10/486* (2013.01); *H02J 7/00711* (2020.01)

(58) Field of Classification Search
USPC .......................... 320/101, 106, 107, 108, 125
See application file for complete search history.

(56) References Cited

U.S. PATENT DOCUMENTS

| 5,455,499 A * | 10/1995 | Uskali ................. H02J 7/00036 340/636.1 |
| 9,541,975 B2 | 1/2017 | Ukai et al. |
| 10,324,703 B2 * | 6/2019 | Choi ........................ G06F 8/65 |
| 2013/0106341 A1 * | 5/2013 | Eaton ................ H01M 8/04917 320/101 |
| 2015/0058654 A1 | 2/2015 | Ukai et al. |
| 2016/0079787 A1 * | 3/2016 | Yechieli .................... G06F 1/26 320/107 |
| 2019/0219990 A1 * | 7/2019 | Dey, IV .............. G06F 3/04842 |

FOREIGN PATENT DOCUMENTS

| CN | 1540358 A | * | 10/2004 |
| JP | 6374067 B2 | | 8/2018 |

* cited by examiner

*Primary Examiner* — Brian Ngo
(74) *Attorney, Agent, or Firm* — McDermott Will & Emery LLP

(57) ABSTRACT

To suppress the occurrence of system shutdown after long term storage of batteries. A semiconductor device comprises a control unit that controls charging and discharging of a battery cell, and a ROM that stores a power supply capability value which specifies a power supply capacity of the battery cell that can be stably supplied to an application system in which the battery pack is provided. After the battery pack returns from the sleep mode and before the transmission request of the power supply capability value is received from the system, the control [unit performs a power supply capability value updating process of updating the power supply capability value in the ROM to a value smaller than the power supply capability value before the sleep mode.

17 Claims, 14 Drawing Sheets

SEMICONDUCTOR DEVICE AND BATTERY PACK

CROSS-REFERENCE TO RELATED APPLICATIONS

The disclosure of Japanese Patent Application No. 2019-047072 filed on Mar. 14, 2019 including the specification, drawings and abstract is incorporated herein by reference in its entirety.

BACKGROUND

A battery pack is provided in applications such as a notebook PC, a tablet terminal, a smart phone, and a digital camera. A semiconductor device of battery control ICs (FGIC:Fuel Gauge IC) for controlling charge/discharge and the like is provided in a battery pack. For example, patent Document 1 discloses a battery pack in which such a battery control IC is mounted.

[Paten Document 1] Japanese Patent No. 6374067

Patent Document 1 discloses a method of accurately calculating a maximum electric energy that can be supplied from the battery at a semiconductor device when a CPU operates with high speed clock. Specifically, when a discharge current exceeding a predetermined threshold is detected, a voltage and the discharge current of the battery can be measured. A data processing control unit estimates an internal resistance of the battery based on a voltage measurement value measured by a voltage measurement unit and a current measurement value measured by a current detection unit, and calculates the maximum amount of electric power that can be supplied from the battery based on the estimated value.

SUMMARY

In applications, a load that can be applied to the system is calculated, and a heavily loaded process is temporarily executed to the extent that a calculated load does not exceed. The calculated load is calculated an allowable current load calculation algorithm such as DBPT (Dynamic Battery Power Technology).

Here, it is assumed that an end user of the battery pack does not use an application for a long time, and then starts the application. In this case, a system shutdown may occur in the application. More specifically, when an application is stored for a long time, the battery may deteriorate and an internal resistance of the battery may increase depending on storage conditions such as a holding voltage and temperature of the battery. If a heavily loaded process is executed before the information is transmitted from the battery side to the system side, a voltage drop becomes larger than expected, and a system shutdown occurs.

FIG. 14 illustrates an example of process at the time of system startup according to a related art. FIG. 14 shows an operation of a battery FGIC and a system. When a system is stopped and a battery is in a sleep mode (step S101), if a power button is operated, the FGIC receives a return trigger from the system and performs a return/start process of the battery pack (step S102).

The FGIC checks the inside of the battery pack for abnormalities, and when confirming no abnormality (step S103), starts discharging from the battery, and supplies power to the system (step S104).

The system is powered on and the system starts (step S201). When the system starts, the system checks the system status, (step S202). The check of the system status includes check items such as a ROM (Read Only Memory) check and a register check. The system executes these check items in a time of the order of a few seconds. If the system status is not abnormal, the system returns to normal (step S203). In the meantime, the FGIC measures the current in the battery pack and the internal resistance (impedances) of the battery pack (step S105).

When the system returns to the normal state, the system requests to transmit updated data of the power supply capability (e.g., SPC: SusPeakCurrent) (step S204). The SPC means a current value of a power source that a battery can supply stably for a predetermined time. However, inside of the battery pack, as shown in FIG. 14, after the measurement of the current in the battery pack, the measurement of the internal resistance, and the like are performed in the step S105, the process of updating the SPC is not performed. Therefore, in response to the SPC transmission request from the system, the FGIC transmits the SPC before entering the sleep mode (step S106).

Upon receiving the SPC data (step S205), the system calculates the loads that is allowed to apply to the system based on the received SPC (step S206). In step S207, the DBPT temporarily executes a heavily loaded process to the extent that the load does not exceed the calculated load in step S206.

However, as described above, in the sleep mode, the battery deteriorates, and the internal resistance of the battery rises. Therefore, when the load that can be applied to the system is calculated using the SPC before the sleep mode, the system shutdown occurs due to the voltage drop.

Other objects and novel features will be apparent from the description of this specification and the accompanying drawings.

A plurality of semiconductor devices according to a plurality of embodiments are described in this specification. A semiconductor device of one embodiment will be described as follows.

A semiconductor device is provided in a battery pack, and configured to include a control unit that controls charging and discharging of a battery, and a ROM configured to store a power supply capability value which specifies a power supply capacity of the battery that can be stably supplied to an application system in which the battery pack is mounted. After the battery pack returns from the sleep state and before the transmission of the power supply capability value is requested from the system, the control unit updates the power supply capability value stored in the ROM to a value smaller than the power supply capability value before the sleep mode.

According to one embodiment, it is possible to suppress the occurrence of system shutdown after long-term storage of the battery.

DETAILED DESCRIPTION

Figure 1:
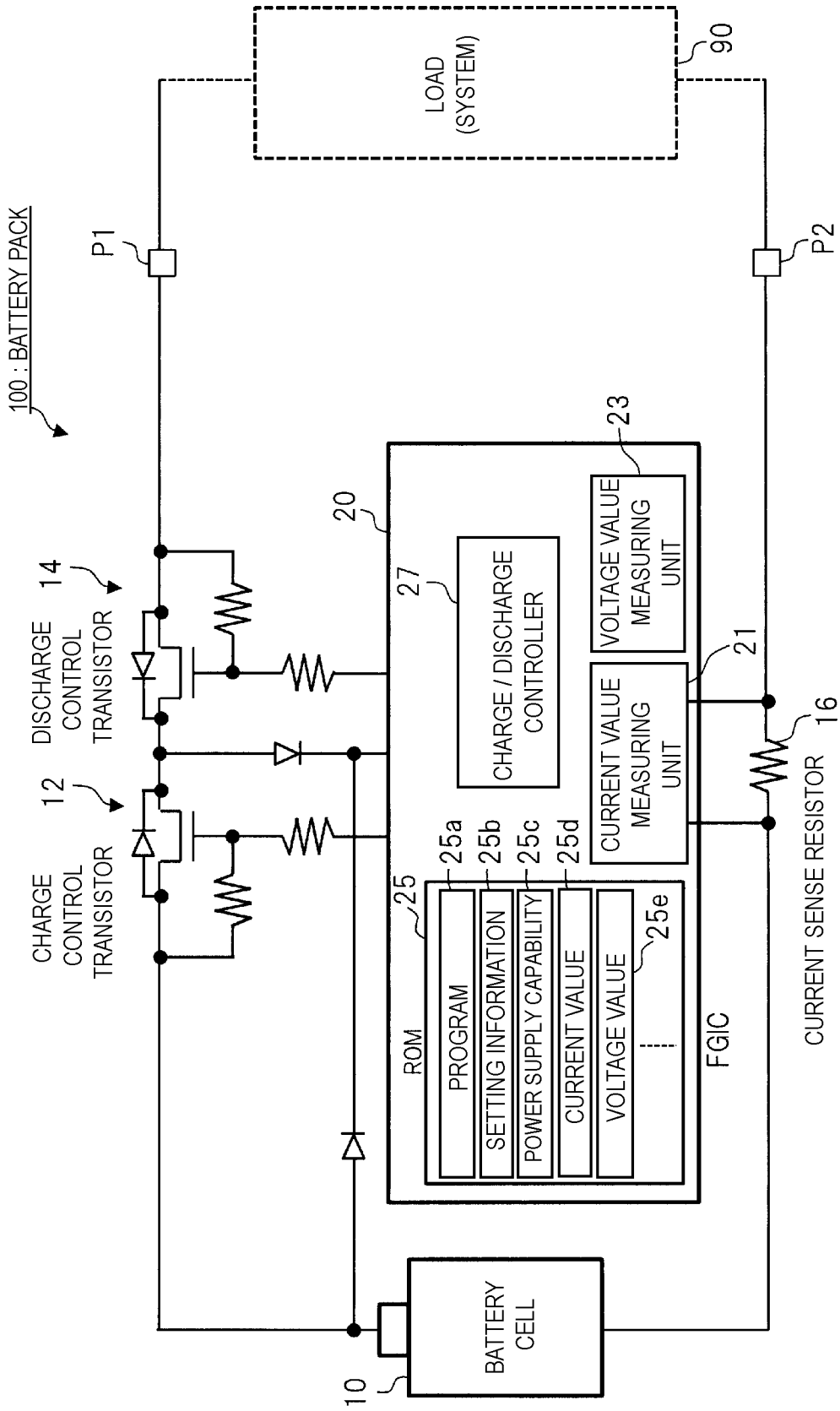
FIG. 1 illustrates an example of a configuration of a battery pack according to a first embodiment.

Hereinafter, embodiments of the present invention are described in detail with reference to the drawings. In all the drawings for explaining the embodiments, same portions are denoted by same reference numerals in principle, and repetitive descriptions thereof are omitted.

First Embodiment

In the following embodiments, the power supply capability value updating process is performed in the battery pack prior to receiving the power supply capability value transmission request from the system.

Configuration of Battery Pack

FIG. 1 illustrates an example of a configuration of a battery pack according to the first embodiment. As shown in FIG. 1, a battery pack 100 includes a battery cell 10, a charge control transistor 12, a discharge control transistor 14, a current sense resistor 16, a FGIC 20, and the like.

The battery pack 100 is provided with a load 90 (or a system) via a positive end P1 and a negative end P2, and supplies power to the load 90.

The battery cell 10 is composed of a secondary battery such as a lithium battery or a lithium ion battery. The battery cell 10 may be composed of a plurality of cells, or may be composed of only a single cell.

The charge control transistor 12 is a circuit element that mainly performs current control at the time of charging the battery cell 10. The charge control transistor 12 is, for example, a field-effect transistor such as a NMOS. As shown in FIG. 1, a gate of the charge control transistor 12 is connected to the FGIC 20. The charge control transistor 12 is switched on and off by gate-voltage control from the FGIC 20.

The discharge control transistor 14 is a circuit element that performs current control when the battery cell 10 is discharged, that is, when power is supplied to the load 90. The discharge control transistor 14 may be composed of a field-effect transistor such as a NMOS. A gate of the discharge control transistor 14 is connected to the FGIC 20. The discharge control transistor 14 is switched on and off by gate-voltage control from the FGIC 20.

The current sense resistor 16 is a circuit element for detecting a load current supplied to the load 90. The current sense resistor 16 is connected to the FGIC 20. The current value $I_s$ of the load current is measured by a current value measuring unit 21 (described later) provided in the FGIC 20.

As shown in FIG. 1, the FGIC 20 includes a current value measuring unit 21, a voltage value measuring unit 23, a ROM (Read Only Memory) 25, a charge/discharge controller (controller) 27, and the like.

The current value measuring unit 21 is a circuit block for measuring the current value $I_s$ of the load current flowing through the current sense resistor 16. The current value measuring unit 21 includes, for example, a current value measuring circuit and an AD converter. The current value measuring unit 21 digitally converts the current value $I_s$ of the load current acquired by the current value measuring circuit by the AD converter, and outputs a digitized current value $I_s$. The outputted value is stored in the ROM 25, for example.

The voltage value measuring unit 23 is, for example, a circuit block that measures a voltage of the positive end P1 of the battery pack 100, or a end-to-end voltage between the positive end P1 and the negative end P2, and the like. The voltage value measuring unit 23 may measure a end-to-end voltage of the battery cell 10. At this time, the voltage value measuring unit 23 may measure a end-to-end voltage for each cell. The voltage value measuring unit 23 includes, for example, a voltage value measuring circuit and an AD converter. The voltage value measuring unit 23 digitally converts the voltage value acquired by the voltage value measuring circuit in the AD converter, and outputs a digitized voltage value. The outputted value is stored in the ROM 25, for example.

The ROM 25 is functional block for storing various types of information, program, and the like relating to the battery pack 100. As shown in FIG. 1, the ROM 25 has memory areas for storing program 25a for controlling the battery pack 100, setting information 25b, power supply capability values 25c, measured current values 25d, measured voltage values 25e, and the like. The ROM 25 may be configured by a flash memory, a register, or the like, or may be configured by combination of the flash memory and the register.

The power supply capability value 25c is a value that defines the power supply capability of the battery cell 10 that can be stably supplied to the system of the application. As the power supply capability values, for example, MaxPeakPower (MPP), MaxPeakCurrent (MPC), SusPeakPower (SPP), SusPeakCurrent (SPC), and the like are used. MPP indicates a power value of a power supply that can be supplied instantaneously to the system, and MPC indicates a current value of a power supply that can be supplied instantaneously to the system. In addition, SPP indicates a power value of a power supply that can be stably supplied to the system for a predetermined period of time, and SPC indicates a current value of the power supply that can be stably supplied to the system for a predetermined period of time. The power supply capability value 25c is updated even when the application system or the battery pack 100 returns from the sleep mode or during normal operation. The update processing of the power supply capability value 25c when returning from the sleep mode is restored will be described in detail later.

Figure 2:
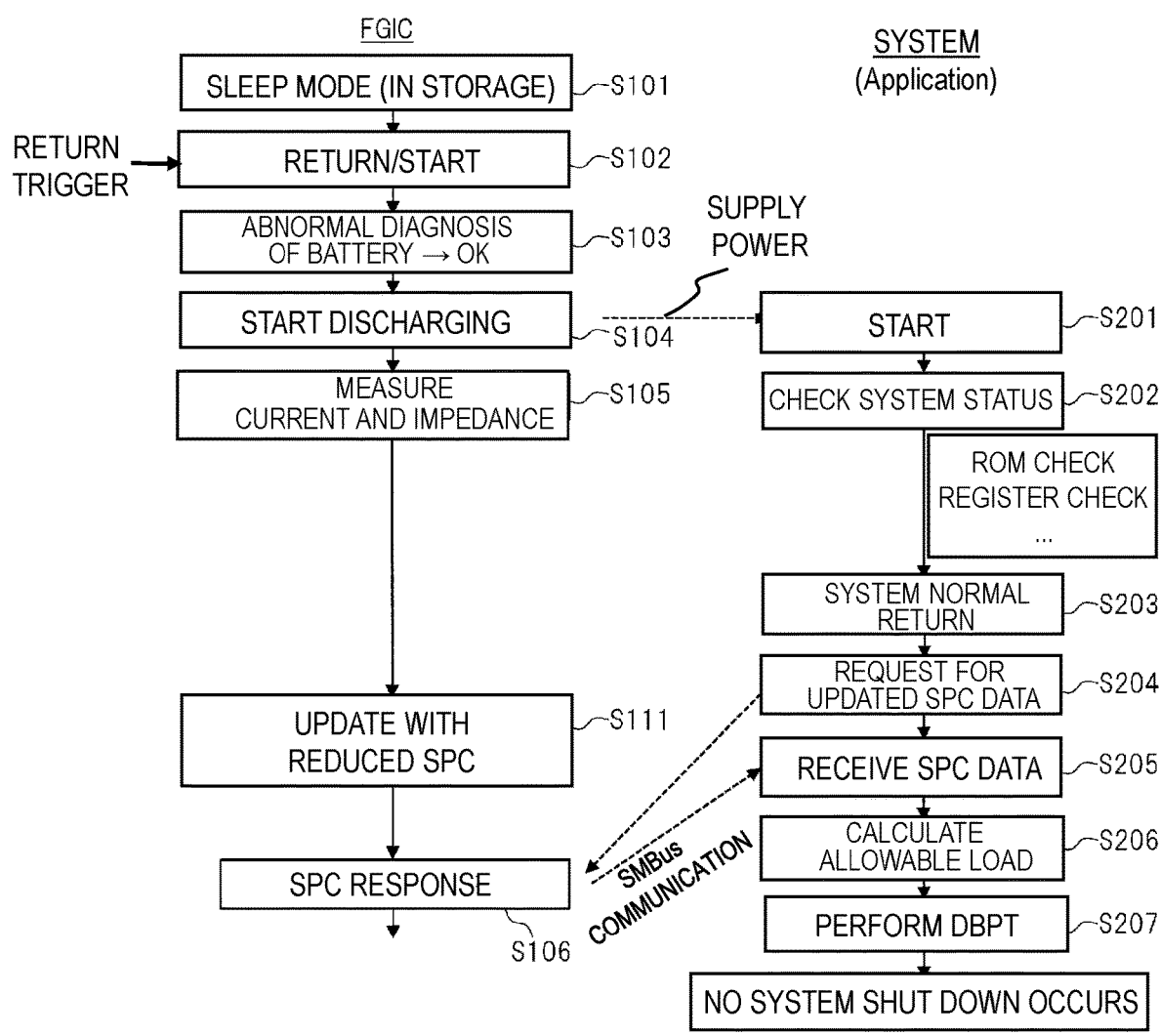
FIG. 2 illustrates an example of process at the time of system startup according to the first embodiment.
Figure 14:
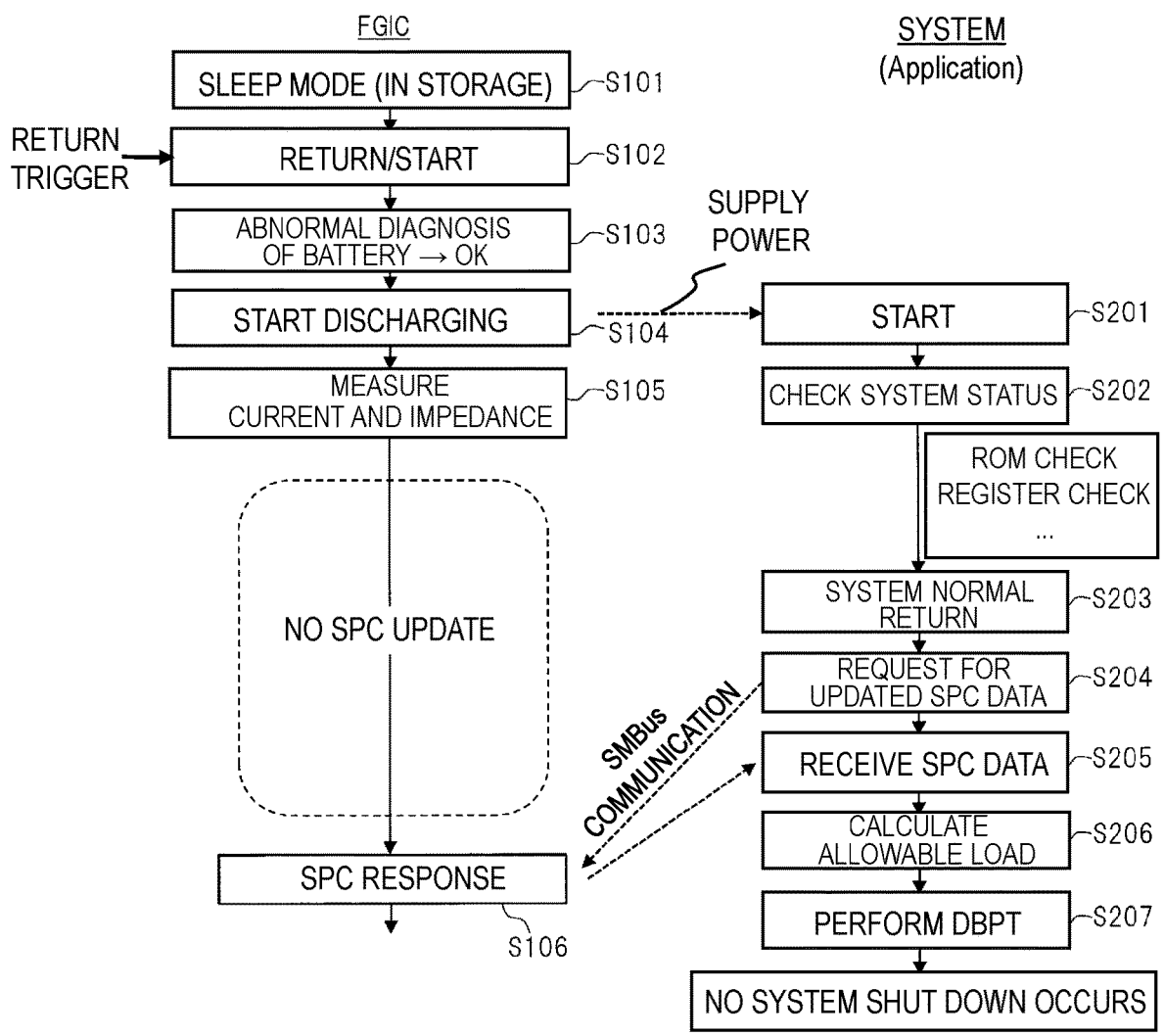
FIG. 14 illustrates an example of process at the time of system startup according to the related art.

Processing of Updating the Power Supply Capacity Value when Returning from the Sleep Mode Here, the processing of updating the power supply capacity value when returning from the sleep mode will be described. FIG. 2 illustrates an example of process at the time of system startup according to the first embodiment. FIG. 2 is similar to FIG. 14 previously described. Therefore, in FIG. 2, steps corresponding to those in FIG. 14 are denoted by same reference numerals. In the following description, it is assumed that SPC is used as the power supply capability value, but other values may be used.

In the present embodiment, with respect to the battery pack 100, the steps of returning from the sleep mode (step S101, S102), checking for internal abnormalities (step S103), supplying power to the system (step S104), and measuring of current or internal resistance (step S105) are performed in the same manner as in FIG. 14. Similarly, with respect to the system, the steps of starting when the power is supplied from the battery pack 100 (step S201), checking system status (step S202), returning the system to normal (step S203), and requesting a transmission of the updated data of the power supply capability values (e.g., SPCs) are the same as those in FIG. 14.

In the present embodiment, after the battery pack 100 returns from the sleep mode and before the battery pack 100 receives a transmission request of the power supply capability value from the system, an updating process of the power supply capability value stored in the ROM 25 to a value smaller than that before the sleep mode (step S111).

The Step S111 will be described in detail. The ROM 25 immediately after the restoration stores the power-supply capability values 25c prior to entering the sleep mode. The charge/discharge controller 27 of the FGIC 20 reads the power supply capability value 25c stored in the ROM 25, and sets the power supply capability value for updating to a value smaller than the read value. Then, the charge/discharge controller 27 updates the power supply capability value 25c of the ROM 25 by replacing the power supply capability value 25c with the update value set here. The setting value of the power supply capability is not particularly limited, but is set to a value in consideration of, for example, the degree of deterioration assumed when the sleep mode continues for a long period. As described above, in the present embodiment, the value of the power supply capability value 25c is updated without determining whether or not the battery pack 100 is in the long-term storage state.

Upon receiving the transmission request of the power supply capability value from the system, the charge/discharge controller 27 reads the power supply capability value 25c updated in step S111, transmits the read power supply capability value 25c to the system via a bus, and replies to the transmission request in step S106. Communication between the battery pack 100 and the system is performed via a bus such as SMBus (System Management Bus), for example. In this manner, in the present embodiment, the step S111 is executed prior to receiving the request for transmitting the power supply capability value from the system, and the power supply capability value is updated.

Upon receiving the updated power supply capability value 25c from the battery pack 100 (step S205), the system uses the updated power supply capability value 25c to calculate a load that can be applied to the system (step S206). In step S207, the DBPT temporarily executes a heavily loaded process to the extent that the load does not exceed the calculated load in step S206.

Although the process of step S111 is performed at a timing between step S105 and step S106, step S111 may be performed at any timing prior to execute step S106 after the battery pack 100 is restored and started in step S102.

Main Effects of the Present Embodiment

According to the present embodiment, after the battery pack 100 returns from the sleep mode and before the battery pack 100 requests a transmission of the power supply capability value from the system, the FGIC 20 updates the power supply capability value 25c stored in the ROM 25 to a value smaller than the value. According to this configuration, since the load that can be applied to the system is calculated in consideration of the deterioration state of the battery pack 100 in the sleep mode, it is possible to suppress the occurrence of system shutdown after long-term storage of the battery.

According to the present embodiment, the value of the power supply capability value 25c is updated without determining whether or not the battery pack 100 is in a long-term storage state. According to this configuration, the power supply capability value updating process is reduced, and the processing time is shortened.

Further, the FGIC 20 can independently update the power supply capability value 25c without cooperating with the system.

Second Embodiment

Next, second embodiment will be described. In the present embodiment, it is determined whether or not the battery pack 100 has been stored for a long period of time after the battery pack 100 is restored. In the following embodiments, descriptions of portions overlapping with those of the above-described embodiments are omitted in principle.

Figure 3:
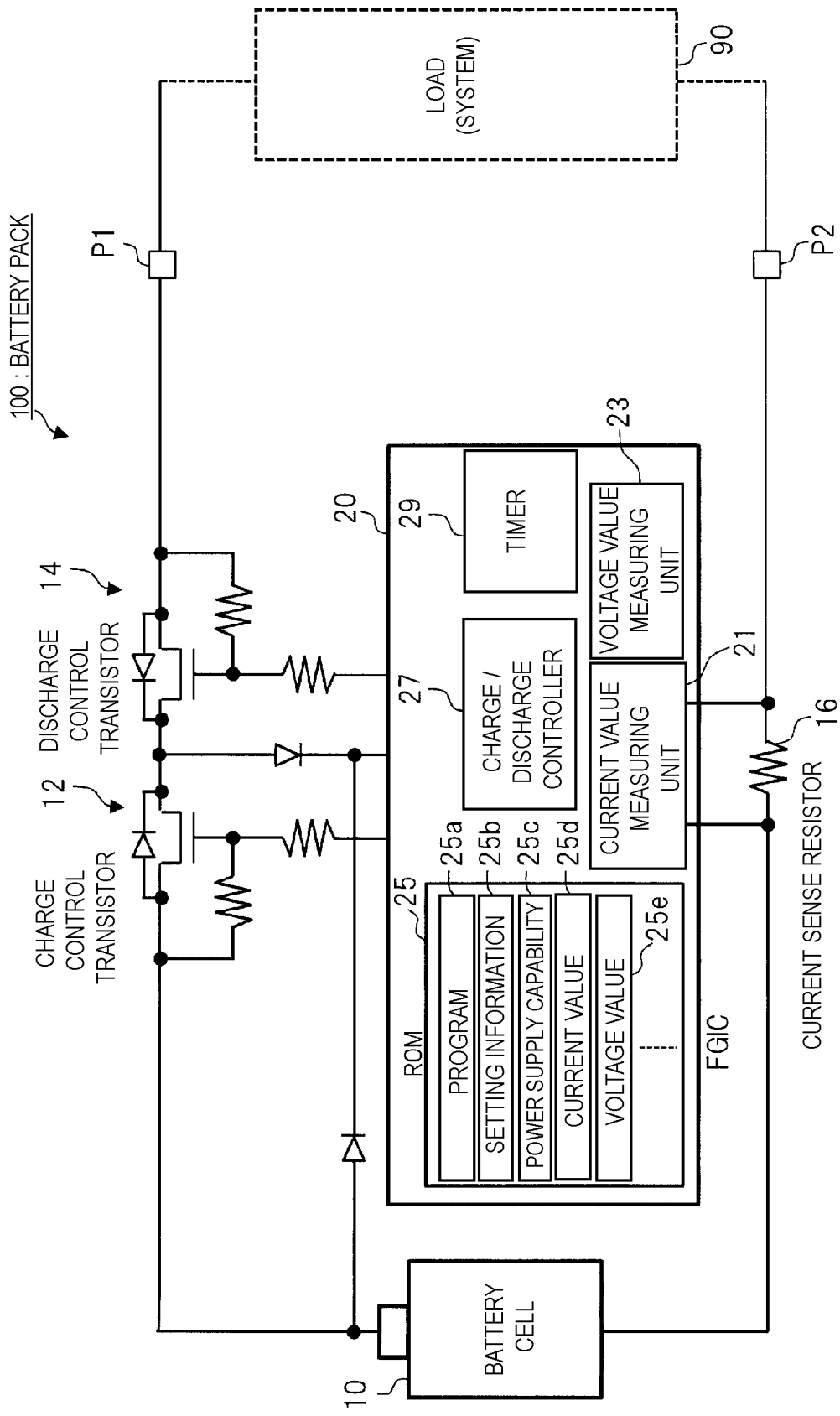
FIG. 3 illustrates an example of a configuration of a battery pack according to a second embodiment.

FIG. 3 illustrates an example of a configuration of a battery pack according to the second embodiment. The battery pack 100 of FIG. 3 is similar to the battery pack 100 of FIG. 1, except that a timer 29 is added to the FGIC 20 of the timer 29. The timer 29 may be provided on the outer side of the FGIC 20.

Figure 4:
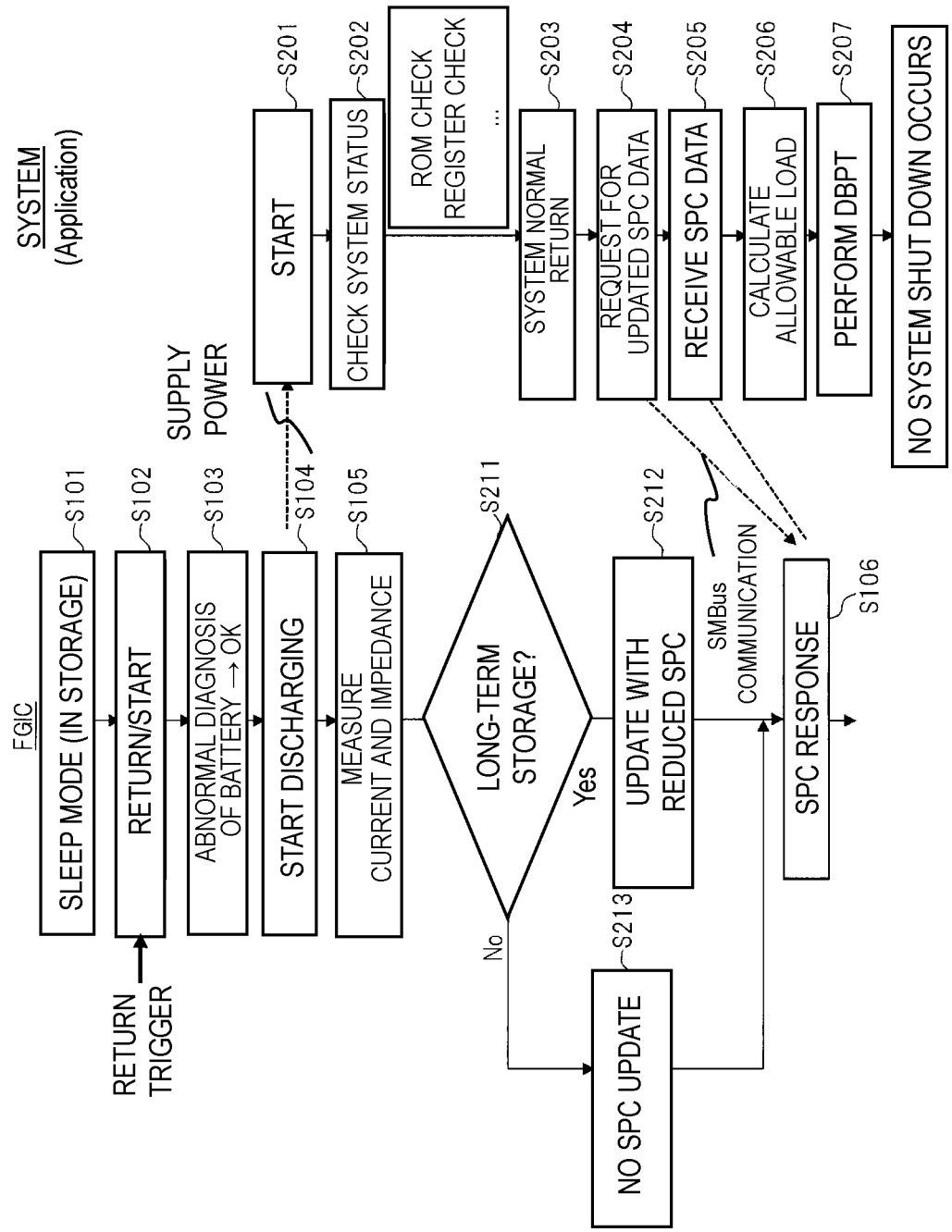
FIG. 4 illustrates an example of process at the time of system startup according to the second embodiment.

FIG. 4 illustrates an example of process at the time of system startup according to the second embodiment. FIG. 4 is similar to FIG. 2, but differs from FIG. 2 in the process between step S105 and step S106. In the present embodiment, as shown in FIG. 4, the process of step S211~S213 is performed after step S105 and prior to step S106.

In step S211, the charge/discharge controller 27 determines whether or not the sleep period from the time when the battery pack 100 enters the sleep mode to the time when the battery pack 100 returns to the sleep mode is the long-term storage state. More specifically, in step S211, the charge/discharge controller 27 performs a storage period determination process for determining whether or not the sleep period from the time when the battery pack 100 enters the sleep mode to the time when the battery pack 100 returns to the sleep mode is equal to or longer than a predetermined sleep period determination threshold. The sleep duration determination thresholds are preset values, and are stored in, for example, the ROM 25. The charge/discharge controller 27 performs the storage period determination process from the ROM 25 using the sleep period determination thresholds.

In the present embodiment, it is assumed that the battery pack 100 can operate in the low-power-consumption mode even when the battery pack 100 is in the sleep mode. When the battery pack 100 enters the sleep mode, the timer 29 starts measuring the sleep period of the battery pack 100. When the battery pack 100 returns from the sleep mode, the timer 29 ends the measurement of the sleep period. The measured sleep periods may be transmitted to the charge/discharge controller 27 or may be stored in the ROM 25, for example.

Then, the charge/discharge controller 27 compares the sleep period determination threshold stored in the ROM 25 with the sleep period measured by the timer 29, and when the sleep period is equal to or longer than the sleep period determination threshold, the charge/discharge controller 27 determines that the battery pack 100 is in the long-term storage state (Yes), and updates the ROM 25 power supply capability value 25c (Step S212). In step S212, similarly to step S111 of FIG. 2, the charge/discharge controller 27 updates the power supply capability value stored in the ROM 25 to a value smaller than the power supply capability value stored in the sleep mode.

On the other hand, in step S211, when the sleep period is shorter than the sleep period determination threshold, the charge/discharge controller 27 determines that the battery pack 100 is not in the long-term storage state (NO), and ends the power supply capability value update process without updating the power supply capability value 25c stored in the ROM 25 (step S213).

The charge/discharge controller 27 transmits the updated power supply capability value when the battery pack 100 is in the long-term storage state, and transmits the power supply capability value prior to the sleep mode when the battery pack 100 is not in the long-term storage state in response to the transmission request of the power supply capability value received from the system (step S106).

About Sleep Period Determination Threshold

The sleep period determination threshold used in the storage period determination process may be set in accordance with the number of times of charging and discharging of the battery cell 10. Each time the number of times of charging and discharging is repeated, the battery cell 10 gradually deteriorates. For this reason, if the same sleep period determination threshold value is used for the battery cell having a small number of times of charging and discharging and the battery cell having a large number of times of charging and discharging, the power supply capability value update processing is not appropriately performed for the deteriorated battery cell having a large number of times of charging and discharging. In this case, a power source equal to or larger than the actual capacity must be supplied to the system after the recovery, which may cause a system down.

Therefore, in the present embodiment, information such as a table associating the number of times of charging and discharging with the sleep period determination threshold is stored in the ROM 25 or the like. The charging and discharging controller 27 sets the sleep period determination threshold value based on the number of times of charging and discharging stored in the ROM 25. As a result, an appropriate sleep period determination threshold is set in accordance with the deterioration state of the battery cell.

Main Effects of the Present Embodiment

According to the present embodiment, the following effects are obtained in addition to the effects according to the above-described embodiment. According to the present embodiment, the charge/discharge controller 27 performs a storage period determination process (step S211), and updates the ROM 25 power supply capability value 25c only when the battery pack 100 is determined to be in a long-term storage condition (step S211). According to this configuration, the power supply capability value 25c is updated only when the battery pack 100 deteriorates. As a result, the value of the power supply capability value is appropriately set, and it is possible to apply a heavily load process to the system while suppressing the shutdown even immediately after the restoration.

According to the present embodiment, when the battery pack 100 is in the sleep mode, the timer 29 measures the sleep duration of the battery pack 100. According to this configuration, the battery pack 100 operates even in the sleep mode, and the sleep period can be reliably measured.

Third Embodiment

Next, the third embodiment will be described. In the present embodiment as well, a case which determines whether or not the battery pack 100 has been stored for a long period of time after the battery pack 100 has returned will be described.

Figure 5:
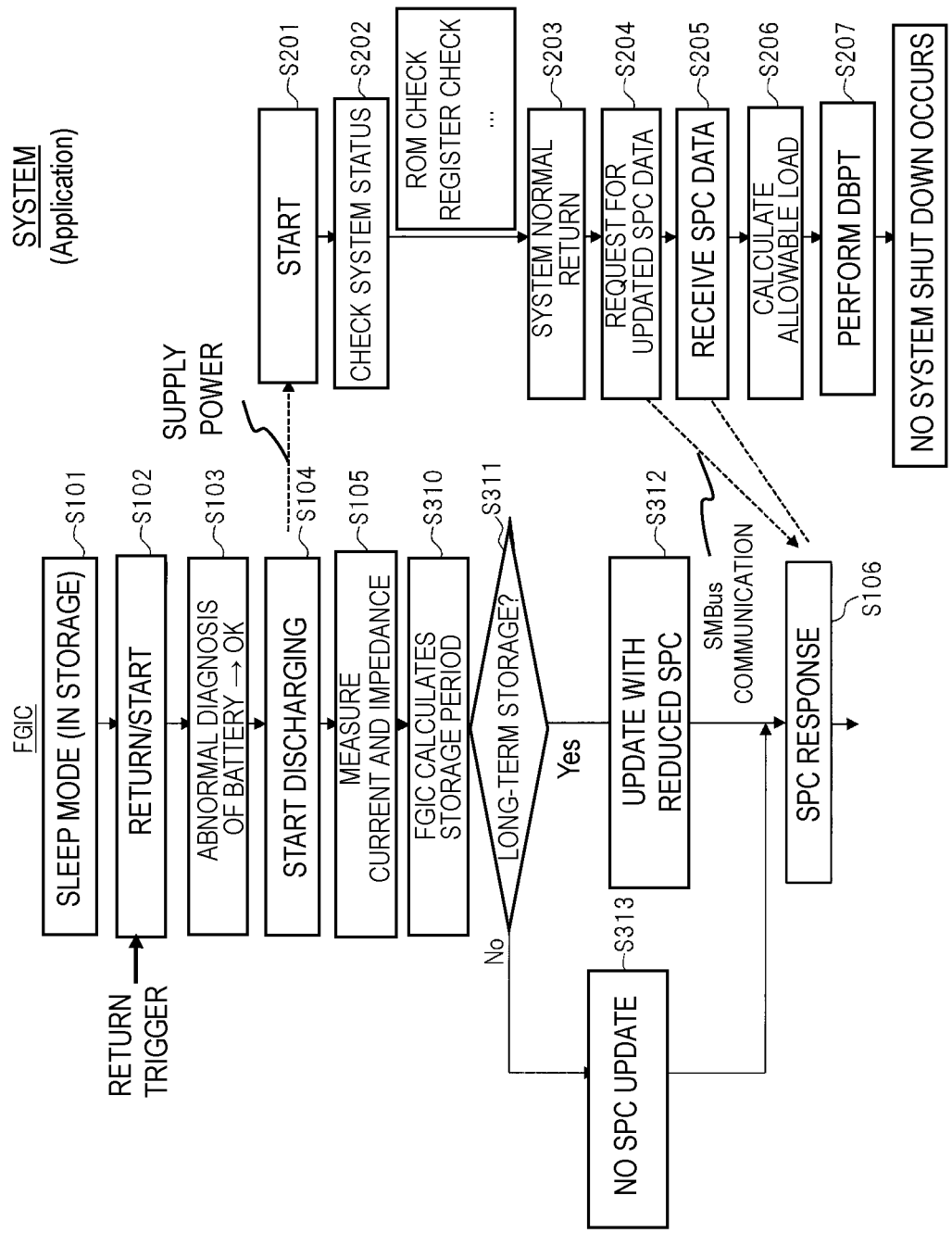
FIG. 5 illustrates an example of process at the time of system startup according to a third embodiment.

FIG. 5 is an example of process at the time of system startup according to the third embodiment. FIG. 5 is similar to FIG. 4, etc., but differs from FIG. 4 in the process between step S105 and step S106. In the present embodiment, as shown in FIG. 5, the process of step S310~S313 is performed after step S105 and prior to step S106.

In the present embodiment, it is assumed that the operation of the battery pack 100 is completely stopped when the battery pack 100 enters the sleep mode. In step S310, the charge/discharge controller 27 calculates the sleep period using the time at which the battery pack 100 enters the sleep mode (sleep mode starting time) and the time at which the battery pack 100 returns from the sleep mode (sleep mode ending time). For example, when the battery pack 100 enters the sleep mode, the charge/discharge controller 27 stores the time in the ROM 25 as the sleep mode start time, and receives the time at which the battery pack 100 returns from the sleep mode as the sleep mode end time. Then, the charge/discharge controller 27 calculates the difference between the sleep mode end time and the sleep mode start time as the sleep period.

In step S311, the charge/discharge controller 27 determines whether or not the battery pack 100 is in a long-term storage state. In step S311, the same process as in step S211 of FIG. 4 is performed. More specifically, the charge/discharge controller 27 compares the sleep period determination threshold stored in the ROM 25 with the sleep period calculated in step S310, and when the sleep period is equal to or longer than the sleep period determination threshold, determines that the battery pack 100 is in a long-term storage state (Yes), and updates the ROM 25 power supply capability value 25c (step S312). In step S312, similarly to step S111 of FIG. 2, the charge/discharge controller 27 updates the power supply capability value stored in the ROM 25 to a value smaller than the power supply capability value stored in the sleep mode.

On the other hand, in step S311, when the sleep period is shorter than the sleep period determination threshold, the charge/discharge controller 27 determines that the battery pack 100 is not in the long-term storage condition (NO), and ends the power supply capability value update process without updating the power supply capability value stored in the ROM 25 (step S313).

Also in the present embodiment, it is desirable to set the sleep period determination threshold in accordance with the number of charge/discharge times of the battery cell 10.

Main Effects of the Present Embodiment

According to the present embodiment, the following effects are obtained in addition to the effects according to the above-described embodiments. According to the present embodiment, the charge/discharge controller 27 performs a storage period determination process (step S311), and updates the ROM 25 power supply capability value 25c only when the battery pack 100 is determined to be in a long-term storage state (step S311). According to this configuration, the power supply capability value 25c is updated only when the battery pack 100 deteriorates. As a result, the value of the power supply capability value is appropriately set, and it is possible to apply a heavily load process to the system while suppressing the shutdown even immediately after the restoration.

According to the present embodiment, the charge/discharge controller 27 receives the time at which the system returns from the sleep mode as the sleep mode end time, and thereby calculates the difference between the sleep mode start time stored in the ROM 25 and the sleep mode end time as the sleep period. According to this configuration, even when the operation of the charge/discharge controller 27 or the like is completely stopped in the sleep mode, it is possible to reliably calculate the sleep period.

Fourth Embodiment

Next, the fourth embodiment will be described. In the present embodiment, the power supply capability value stored in the ROM 25 is multiplied by a predetermined value after the restoration, thereby updating the power supply capability value.

Figure 6:
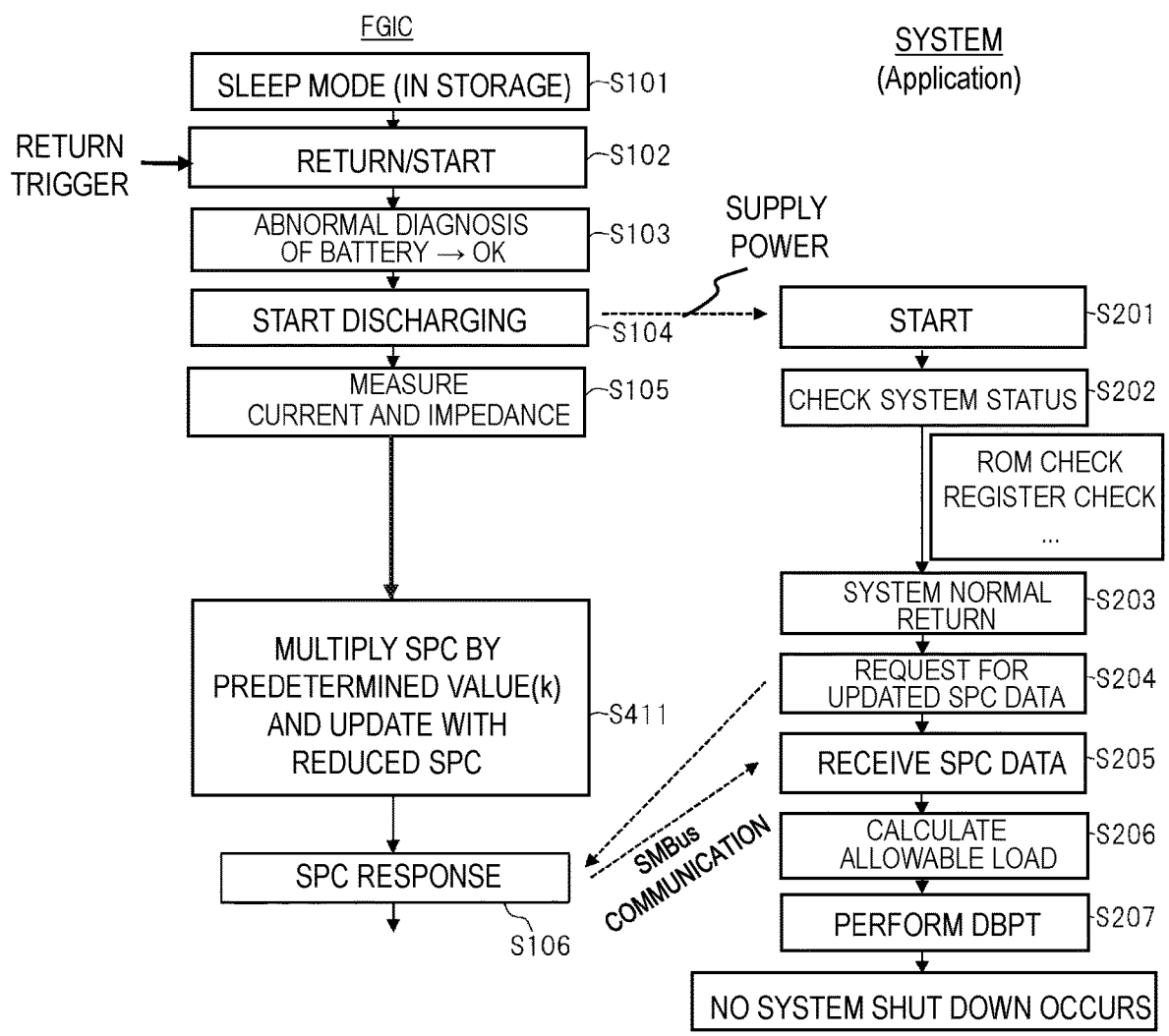
FIG. 6 illustrates an example of process at the time of system startup according to a fourth embodiment.

FIG. 6 illustrates an example of process at the time of system startup according to the fourth embodiment. FIG. 6 is similar to FIG. 2, etc., but differs from FIG. 2, etc., in the process between step S105 and step S106. In the present embodiment, as shown in FIG. 6, the process of step S411 is performed after step S105 and prior to step S106.

In step S411, the charge/discharge controller 27 multiplies the power supply capability value 25c stored in the ROM 25 before the sleep mode by a predetermined value (k) smaller than 1 to calculate a value (first updated value) smaller than the power supply capability value before the sleep mode. Then, the charge/discharge controller 27 updates the power supply capability value 25c stored in the ROM 25 to the first updated value calculated.

The value (k) used in the step S411 is a value smaller than 1, and is written in, for example, the ROM 25 in the manufacturing process prior to the shipping of the product. The value (k) may be set as a single value, or may be appropriately set in accordance with a parameter such as the number of times of charging and discharging as in the above-described embodiment, for example.

According to the present embodiment, the charge/discharge controller 27 calculates the first update value by multiplying the power supply capability value 25c stored in the ROM 25 by a predetermined value (k), and updates the power supply capability value 25c to the first update value. According to this configuration, since the charge/discharge controller 27 calculates the updated value of the power supply capability value 25c by calculation and does not need to perform the storage period determination processing, the load on the charge/discharge controller 27 is reduced.

Fifth Embodiment

Next, the fifth embodiment will be described. In the present embodiment, the power supply capability updating process is performed using the internal resistance of the power supply paths of the battery pack before and after the sleep mode.

Figure 7:
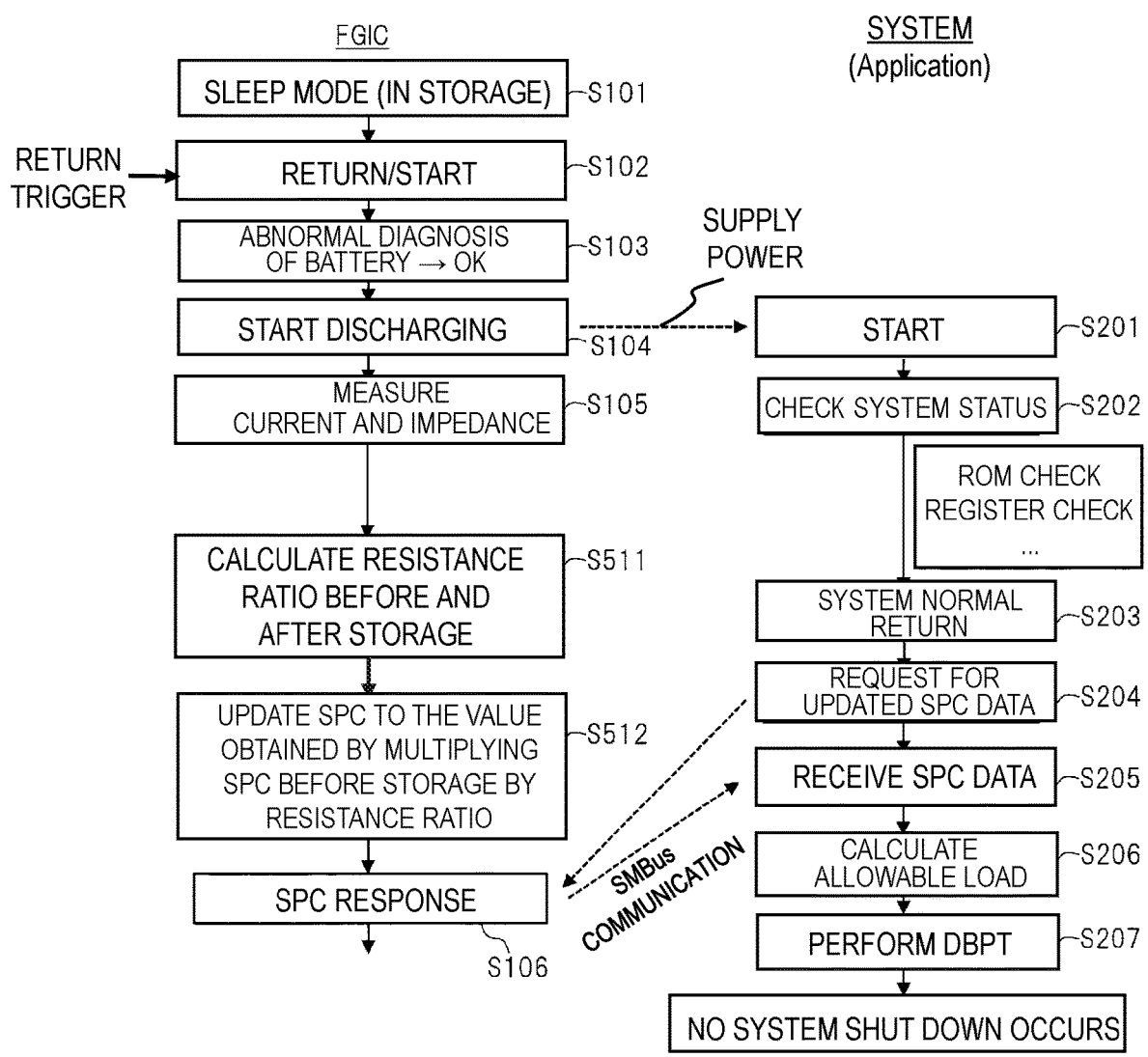
FIG. 7 illustrates an example of process at the time of system startup according to a fifth embodiment.

FIG. 7 illustrates an example of process at the time of system startup according to the fifth embodiment. FIG. 7 is similar to FIG. 2, etc., but differs from FIG. 2, etc., in the process between step S105 and step S106. In the present embodiment, as shown in FIG. 7, the process of step S511~S512 is performed after step S105 and prior to step S106.

First, prior to the battery pack 100 entering the sleep mode, the FGIC 20 measures a total value of the internal resistance of the power supply paths of the battery pack 100 (first total value). More specifically, the current value measuring unit 21 measures the current value of the load current flowing through the current sense resistor 16. In parallel with this, the voltage measuring unit 23 measures the voltage between the terminals of the battery cells 10 or the voltage between the terminals of the battery pack 100 (P1-P2 voltage). For example, the charge/discharge controller 27 measures the total value of the internal resistance of the power supply path before the sleep mode using the current value of the load current measured by the current value measurement unit 21 and the voltage between the terminals measured by the voltage value measurement unit 23. The sum of the internal resistance measured here includes, for example, the internal resistance Rcell of the battery cell 10, the resistor Rpack between the battery cell 10 and the system 90, and the internal resistance Rsys of the system. The sum of the internal resistance Rcell of the battery cell 10 and the resistance Rpack between the battery cell 10 and the system 90 is the internal resistance of the battery pack 100 as a whole. The sum of the measured internal resistance is stored in, for example, a ROM 25.

After returning from the sleep mode, in step S511, the FGIC 20 measures the internal resistance of the power supply path of the battery pack 100 after the sleep mode. The method of measuring the internal resistance is the same as the method described above, and therefore the description thereof is omitted. The internal resistance Ra increased by the deterioration of the battery cell 10 is added to a total value of the internal resistance before the sleep mode (second total voltage). Therefore, the total value of the internal resistance after the sleep mode is larger than the total value of the internal resistance before the sleep mode. The sum of the internal resistance Rcell of the battery cell 10, the internal resistance Ra increased by the deterioration of the battery cell 10, and the resistor Rpack between the battery cell 10 and the system 90 is the internal resistance of the battery pack 100 as a whole after the battery pack 100 is in the sleep mode. As described above, in the present embodiment, in the FGIC 20, the internal resistance of the battery pack 100 is measured again.

Then, in step S511, the charge/discharge controller 27 calculates the ratio of the total value of the internal resistance of the battery pack and the internal resistance of the system before the sleep mode to the total value of the internal resistance of the battery pack and the internal resistance of the system after the sleep mode as the resistance ratio.

In step S512, the charge/discharge controller 27 multiplies the ROM 25 power supply capability value 25c by the resistive ratio calculated in step S511 to calculate a value smaller than the power supply capability value 25c prior to the sleep mode (second updated value). Then, the charge/discharge controller 27 updates the power supply capability value 25c stored in the ROM 25 to the second updated value calculated here.

According to the present embodiment, the updating process of the power supply capability values is performed using the internal resistances of the power supply path of the battery pack 100 before and after the sleep mode. Specifically, the second update value is calculated using the resistance ratio calculated as the ratio of the total value of the internal resistances of the power supply path of the battery pack 100 before the sleep mode (first total value) to the total value of the internal resistance of the power supply paths of the battery pack 100 after the sleep mode (second total value). According to this configuration, the deterioration state of the battery cell 10 can be reflected, and the power supply capability value 25c can be set to an appropriate value.

Sixth Embodiment

Next, a description will be given of the sixth embodiment. In the present embodiment, the storage temperature determination process is performed using the temperature of the battery pack 100 measured during the sleep period.

Figure 8:
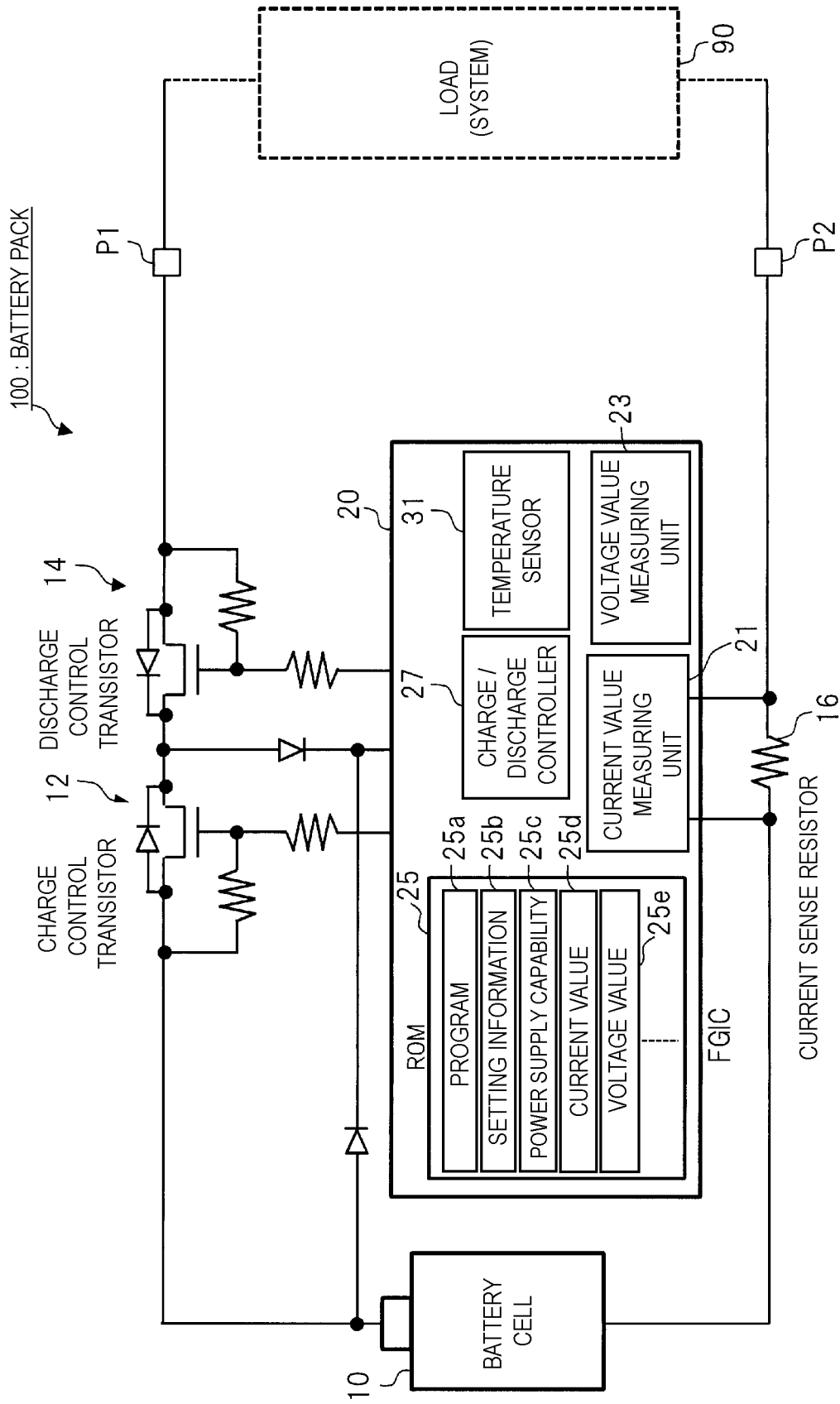
FIG. 8 illustrates an example of a configuration of a battery pack according to a sixth embodiment.

FIG. 8 illustrates an example of a configuration of a battery pack according to the sixth embodiment. The battery pack 100 of FIG. 8 is similar to the battery pack 100 of FIG. 1 and the like, except that a temperature sensor 31 is added to the FGIC 20. The temperature sensor 31 may be provided on an outside of the FGIC 20.

Figure 9:
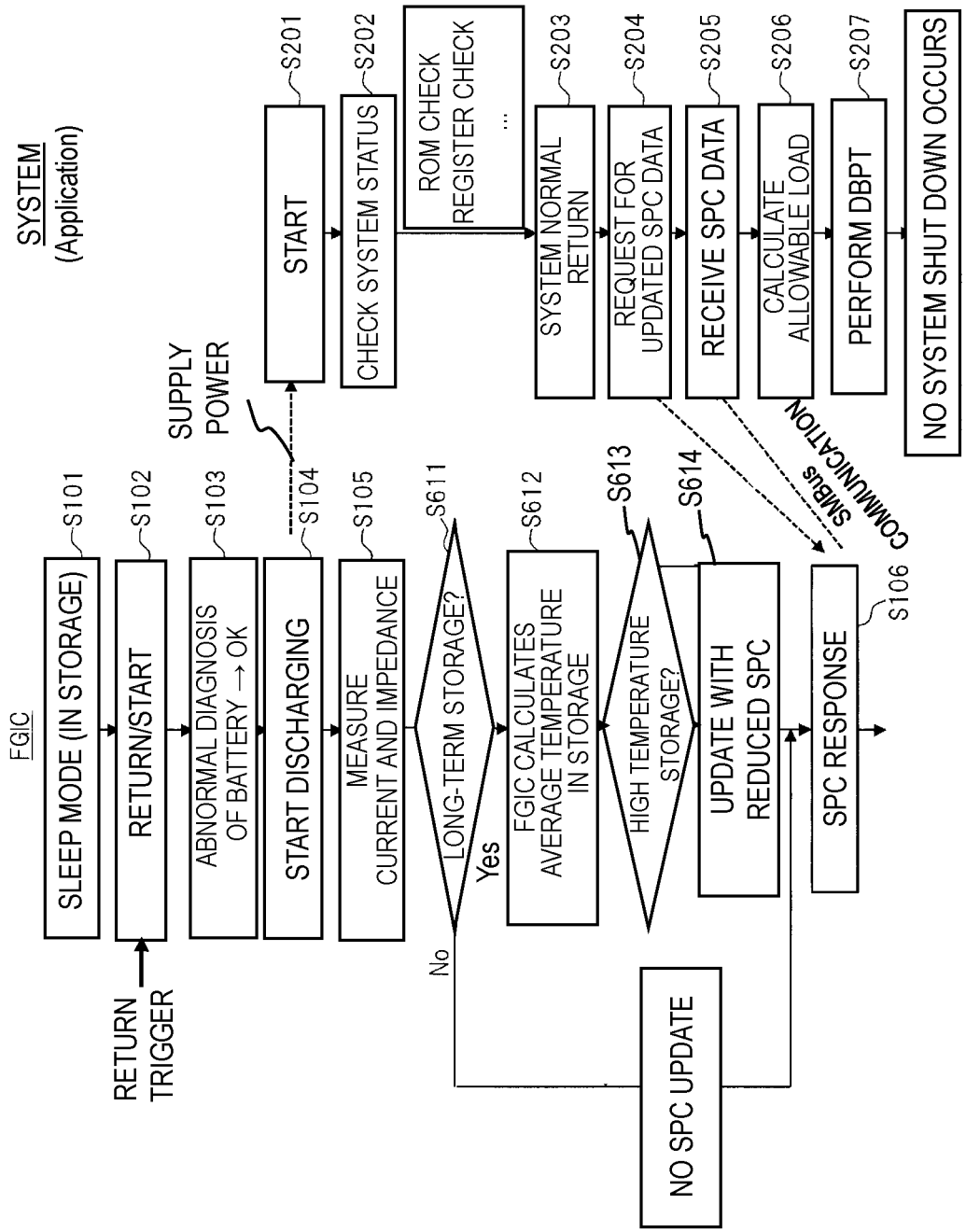
FIG. 9 illustrates an example of process at the time of system startup according to a sixth embodiment.

FIG. 9 illustrates an example of process at the time of system startup according to the sixth embodiment. FIG. 9 is similar to FIG. 2 and the like, but differs from FIG. 2 and the like in the process between step S105 and step S106. In the present embodiment, as shown in FIG. 9, the process of step S611~S615 is performed after step S105 and prior to step S106.

In the present embodiment, it is assumed that the battery pack 100 can operate in a low-power-consumption mode even when the battery pack 100 is in the sleep mode. When the battery pack 100 enters the sleep mode, the temperature sensor 31 starts measuring the temperature of the battery pack 100. Thereafter, the temperature sensor 31 measures the temperature of the battery pack 100 at predetermined interval. The measured temperatures are stored, for example, in the ROM 25. At this time, the measured temperature may be stored in association with the temperature measurement time, the status of the battery pack 100 at the measurement time, or the like. The temperature sensor 31 is provided to monitor the temperature abnormality of the battery pack 100, and continuously measures the temperature of the battery pack 100 even before and after the sleep mode.

The FGIC 20 also measures the sleep period of the battery pack 100 in parallel. The measurement of the sleep duration is performed, for example, by the methods described in the second and third embodiments.

In step S611, the charge/discharge controller 27 determines whether or not the sleep period of the battery pack 100 is in the long-term storage condition. Since the step S611 is the same as the step S211 of FIG. 4, detailed descriptions thereof are omitted. In step S611, when the sleep period is equal to or longer than the sleep period determination threshold, the charge/discharge controller 27 determines that the battery pack 100 is in the long-term storage state (YES), and sets the battery pack 100 to step S612.

In step S612, the charge/discharge controller 27 calculates an average temperature of the battery pack 100 in the sleep period using the temperature stored in the ROM 25. The charge/discharge controller 27 reads out the temperature measured during the sleep from the ROM 25, and calculates the average temperature. The charge/discharge controller 27 may store the calculated average temperatures in the ROM 25. In this manner, by performing the calculation of the average temperature only once, the power consumption in the sleep period is reduced.

Note that, depending on the use state, the charge/discharge controller 27 may calculate the average temperature every time the measured temperature is received during the sleep period, or may calculate the average temperature every predetermined time or predetermined number of times of reception, regardless of the process of the step S612.

In step S613, the charge/discharge controller 27 uses the average temperature calculated in step S612 to perform a storage temperature determination process for determining whether or not high temperature storage has been performed. In the storage temperature determination process, the charge/discharge controller 27 determines whether or not the average temperature of the battery pack 100 in the sleep period calculated in step S612 is equal to or higher than a predetermined temperature determination threshold. When the calculated average temperature is equal to or higher than the temperature determination threshold, the charge/discharge controller 27 determines that the high temperature storage has been performed (Yes), and updates the power supply capability value 25c of the ROM 25 (Step S614). In FIG. 9, the first embodiment step S111 is exemplified as the step S614, but the value of the power supply capability value 25c may be updated by the methods described in other embodiments. In addition, it is desirable that the updated value of the power supply capability value in the present embodiment is considered to be a degree of deterioration due to high temperature storage.

On the other hand, in step S611, when the charge/discharge control circuit 27 determines that the battery pack 100 is not in the long-term storage condition (NO), the charge/discharge control circuit 27 ends the power supply capability value updating process without updating the power supply capability value 25c stored in the ROM 25 (step S615). In step S613, if the calculated mean temperature is lower than the temperature determination threshold, the charge/discharge controller 27 determines that the high-temperature storage is not performed. Also at this time, the charge/discharge controller 27 ends the power supply capability value updating process without updating the power supply capability value 25c stored in the ROM 25 in step S615.

In FIG. 9, the case where the storage period determination process is performed before the storage temperature determination process is illustrated, but the power supply capability value update process may be performed only on the basis of the result of the storage temperature determination process.

According to the present embodiment, the storage temperature determination processing is performed, and it is determined whether or not to update the power supply capability value 25c of the ROM 25 in accordance with the result of the storage temperature determination processing. According to this configuration, since the degree of deterioration according to the storage temperature is considered, the power supply capability value is set to a more appropriate value.

Seventh Embodiment

Comparative Example

Figure 10:
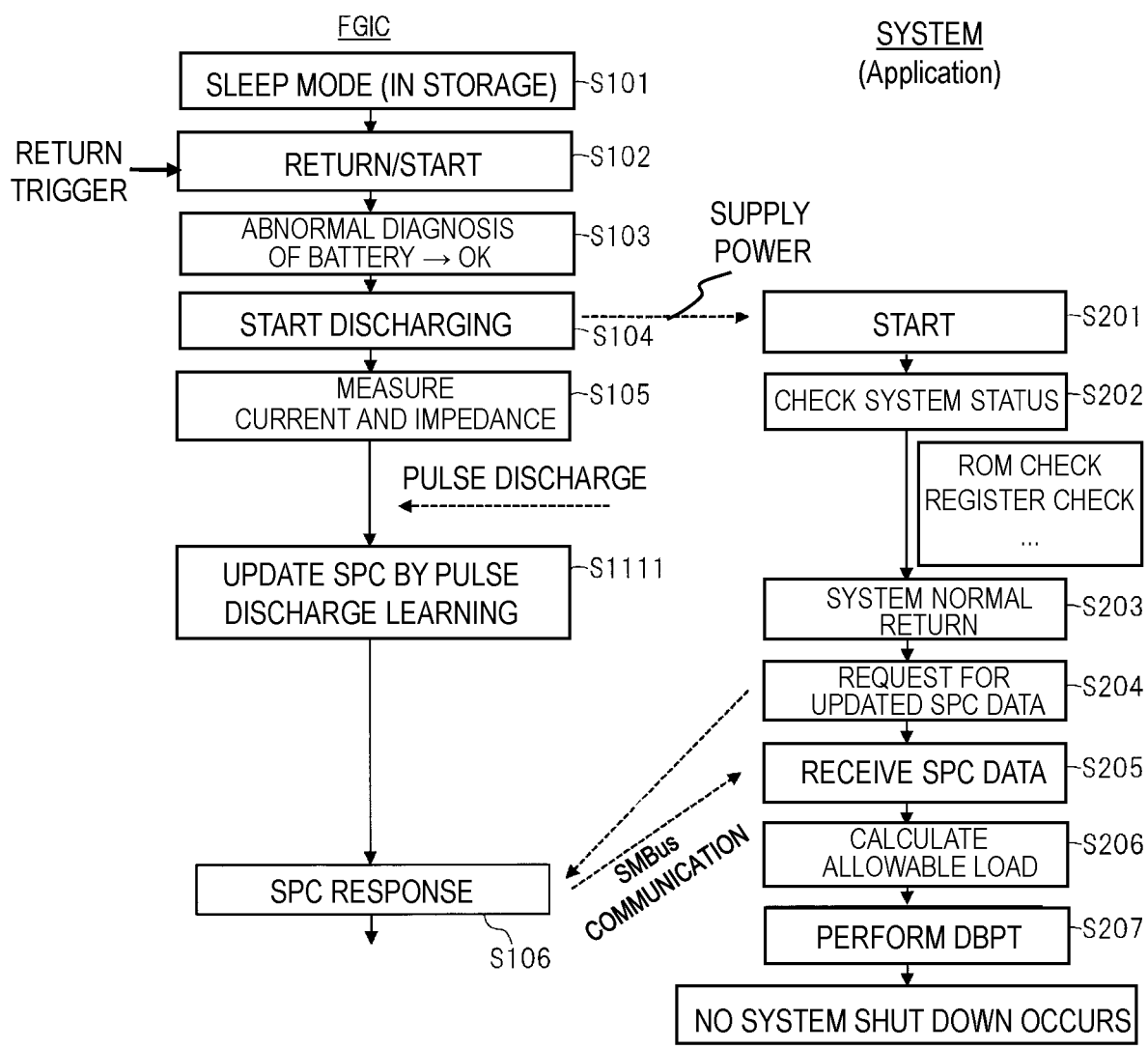
FIG. 10 illustrates an example of process at the time of system startup according to a comparative example.

Before the description of the seventh embodiment, the power supply capability value update processing based on an initiative of the system will be described. FIG. 10 illustrates an example of process at the time of system startup according to the comparative example. FIG. 10 is similar to FIG. 2 and the like, except that between step S105 and step S106, the FGIC generates a pulse discharge in the battery pack in accordance with instruction from the system. The pulse discharge refers to short-circuiting between the positive end and the negative end of the battery pack.

In step S1111, the FGIC measures a current at which the pulse discharge is generated. The pulse discharge is performed a plurality of times while the system fluctuates the load. The FGIC calculates the power supply capability value after the end of the sleep period using the current value at the time of each pulse-discharge, and updates the power supply capability value of the ROM to the calculated value. A series of these processes is called pulse discharge learning or pulse discharge learning. The pulse-discharge learning process is system-driven, and the system and the FGIC cooperate with each other.

Process in the Present Embodiment

Next, the seventh embodiment will be described. In the present embodiment, a process performed when the above-described pulsed discharging process is performed before the power supply capability updating process described in the above-described embodiments is performed will be described.

Figure 11:
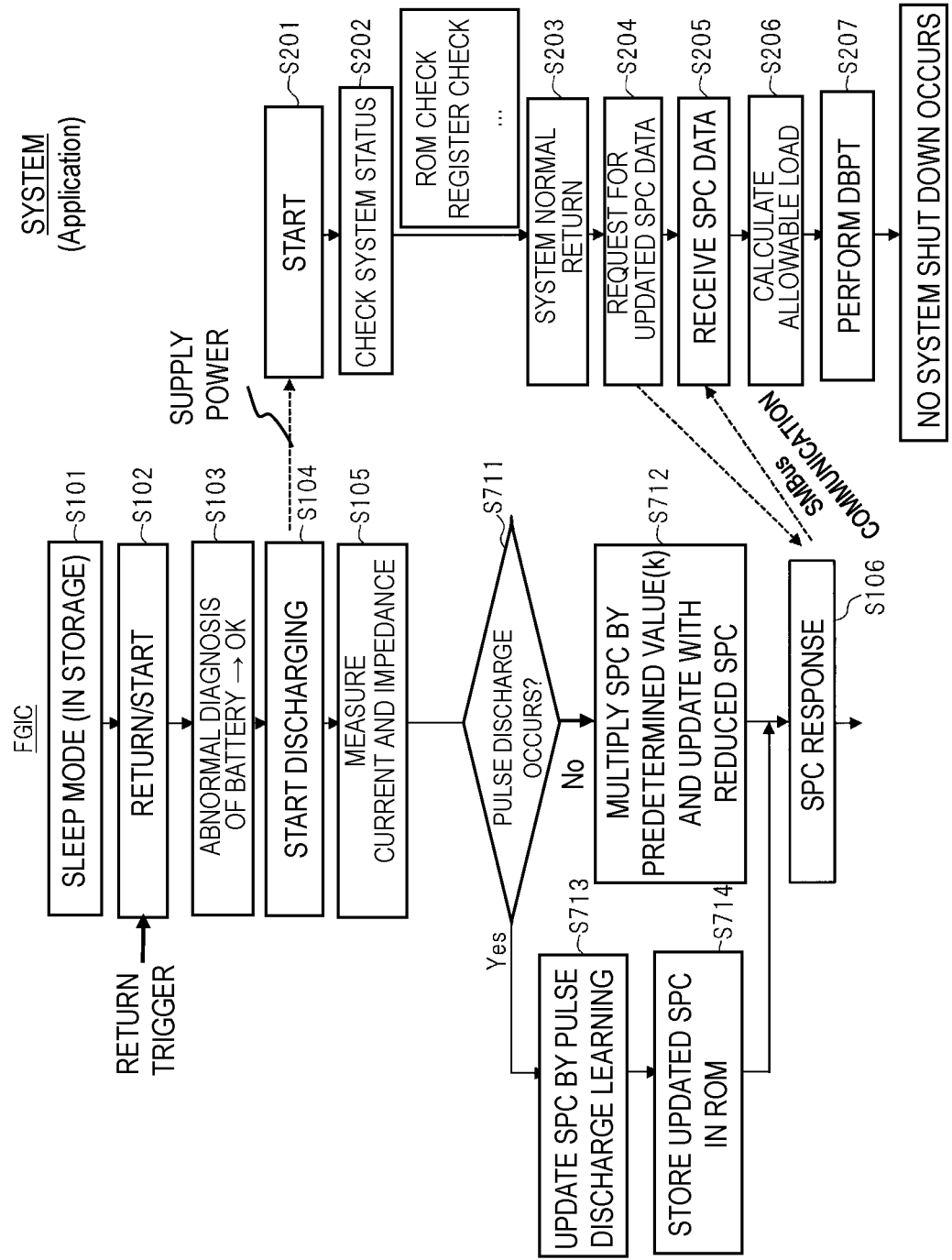
FIG. 11 illustrates an example of process at the time of system startup according to a seventh embodiment.

FIG. 11 illustrates an example of process at the time of system startup according to the seventh embodiment. FIG. 11 is similar to FIG. 2, etc., but differs from FIG. 2, etc., in the process between step S105 and step S106. In the present embodiment, as shown in FIG. 11, the process of step S711~S714 is performed after step S105 and prior to step S106.

In step S711, the charge/discharge controller 27 determines whether or not the pulse discharge has already been generated. When it is determined that the pulse discharge has not yet occurred (NO), the charge/discharge controller 27 performs a power supply capability updating process (S712). In FIG. 11, the process corresponding to the S411 of steps in FIG. 6 described in the fourth embodiment is shown as the power supply capability value updating process, but the processes described in other embodiments may be executed.

On the other hand, when it is determined in step S711 that the pulse discharge is generated (Yes), the pulse discharge learning process is performed to calculate the power supply capability value for updating (step S713), and the ROM 25 power supply capability value 25c is updated to the calculated value (step S714).

Note that in the step S711, whether or not the pulse discharge has been generated has already been set as the determination condition, but in addition to this, whether or not the pulse discharge learning process has already been performed may be set as the determination condition. In this instance, when it is determined in step S711 that the pulse-discharge learning process has already been performed, the charge/discharge controller 27 ends the power supply capability value updating process without updating the power supply capability value.

According to the present embodiment, when the pulse discharge learning process is performed prior to the power supply capability value update process, the charge/discharge controller 27 does not update the power supply capability value by the power supply capability value update process. According to this configuration, the choice of the method of updating the power supply capability value is increased. Further, the pulse discharge learning process and the power supply capability value update process do not overlap, and an appropriate process is selected according to the timing.

Eighth Embodiment

Next, the eighth embodiment will be described. In the present embodiment, the pulse discharge learning process under an initiative of the FGIC will be described.

Figure 12:
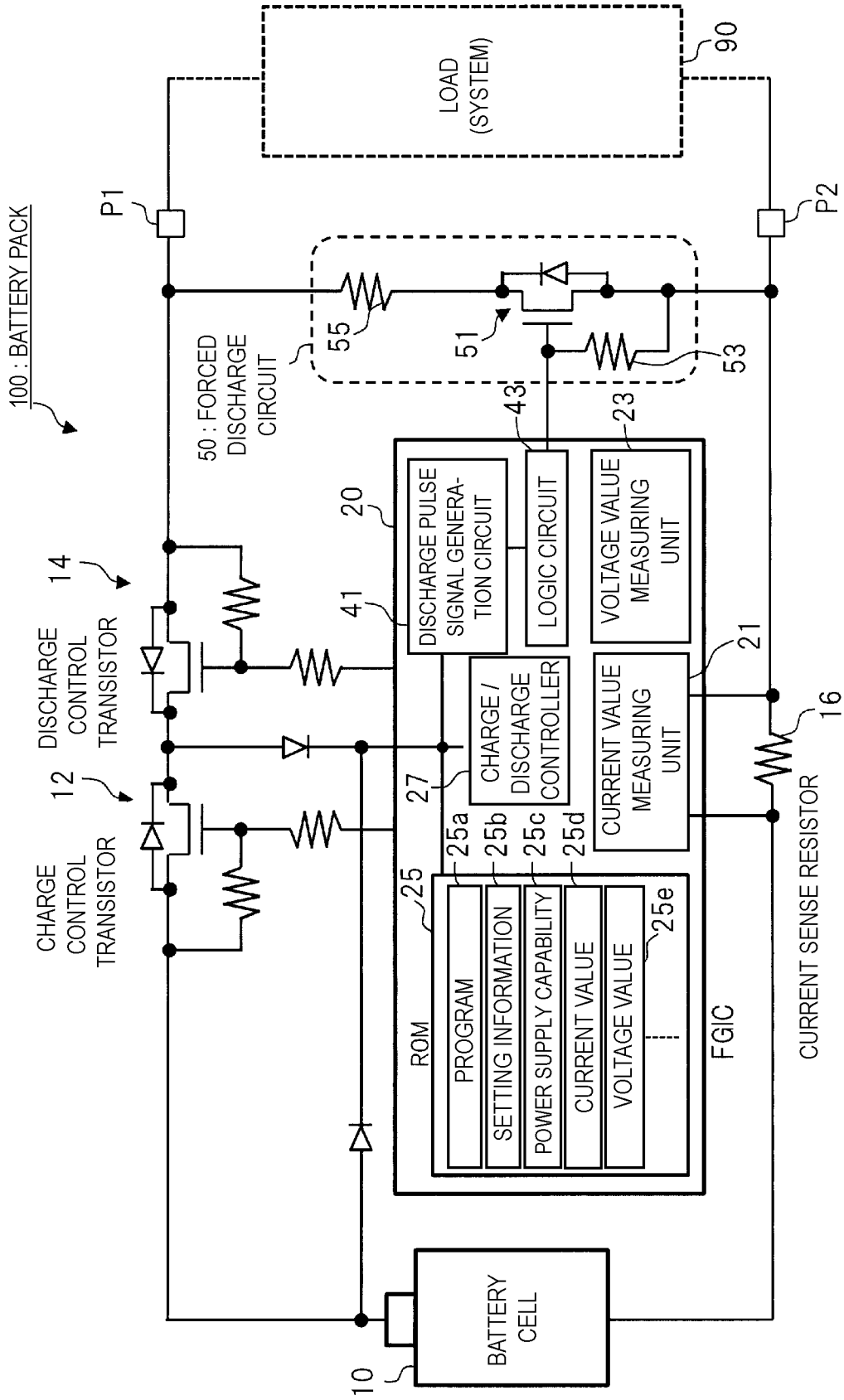
FIG. 12 illustrates an example of a configuration of a battery pack according to an eighth embodiment.

FIG. 12 illustrates an example of a configuration of a battery pack according to the eighth embodiment. The battery pack 100 of FIG. 12 is similar to the battery pack 100 of FIG. 1 and the like, except that a forced discharge circuit 50 is added, and a discharge pulse generation signal generation circuit 41 and a logic circuit 43 are added to the FGIC 20 of the battery pack 100.

The forced discharge circuit 50 is a functional block for short-circuiting the positive end P1 and the negative end P2 of the battery pack 100 in accordance with an instruction from the FGIC 20. The forced discharge circuit 50 includes, for example, a discharge transistor 51 and resistors 53 and 55.

The resistors 53 and 55 are circuit elements for adjusting the amount of current at the time of pulse discharge. The resistor 53 adjusts the amount of current by adjusting the gate voltage of the discharge transistor 51. One end of the resistor 53 is connected to the gate of the discharge transistor 51, and the other end of the resistor 53 is connected to the negative end P2. The resistor 55 is connected in series with the discharge transistor 51 between the positive end P1 and the negative end P2. For example, one end of the discharge transistor 51 is connected to the negative end P2, and one end of the discharge transistor 51 is connected to one end of the resistor 55. The other end of the resistor 55 is connected to the positive end. The gate of the discharging transistor 51 is connected to the FGIC 20.

The discharge pulse generation signal generation circuit 41 is a functional block for generating a discharge pulse generation signal for turning on the discharge transistor 51. The discharge pulse generation signal generation circuit 41 generates a discharge pulse generation signal in accordance with an instruction from, for example, the charge/discharge controller 27, and outputs the generated discharge pulse signal to the logic circuit 43.

The logic circuit 43 supplies a discharge pulse generation signal to the gate of the discharge transistor 51 in accordance with, for example, an instruction from the charge/discharge controller 27. When the discharge pulse generation signal is supplied, the discharge transistor 51 is turned on, the positive end P1 and the negative end P2 are short-circuited, and a pulse discharge is generated. On the other hand, when the supply of the discharge pulse generation signal is stopped, the discharge transistor 51 is turned off. The discharge pulse generation signal generation circuit 41 may be included in the charge/discharge controller 27.

Figure 13:
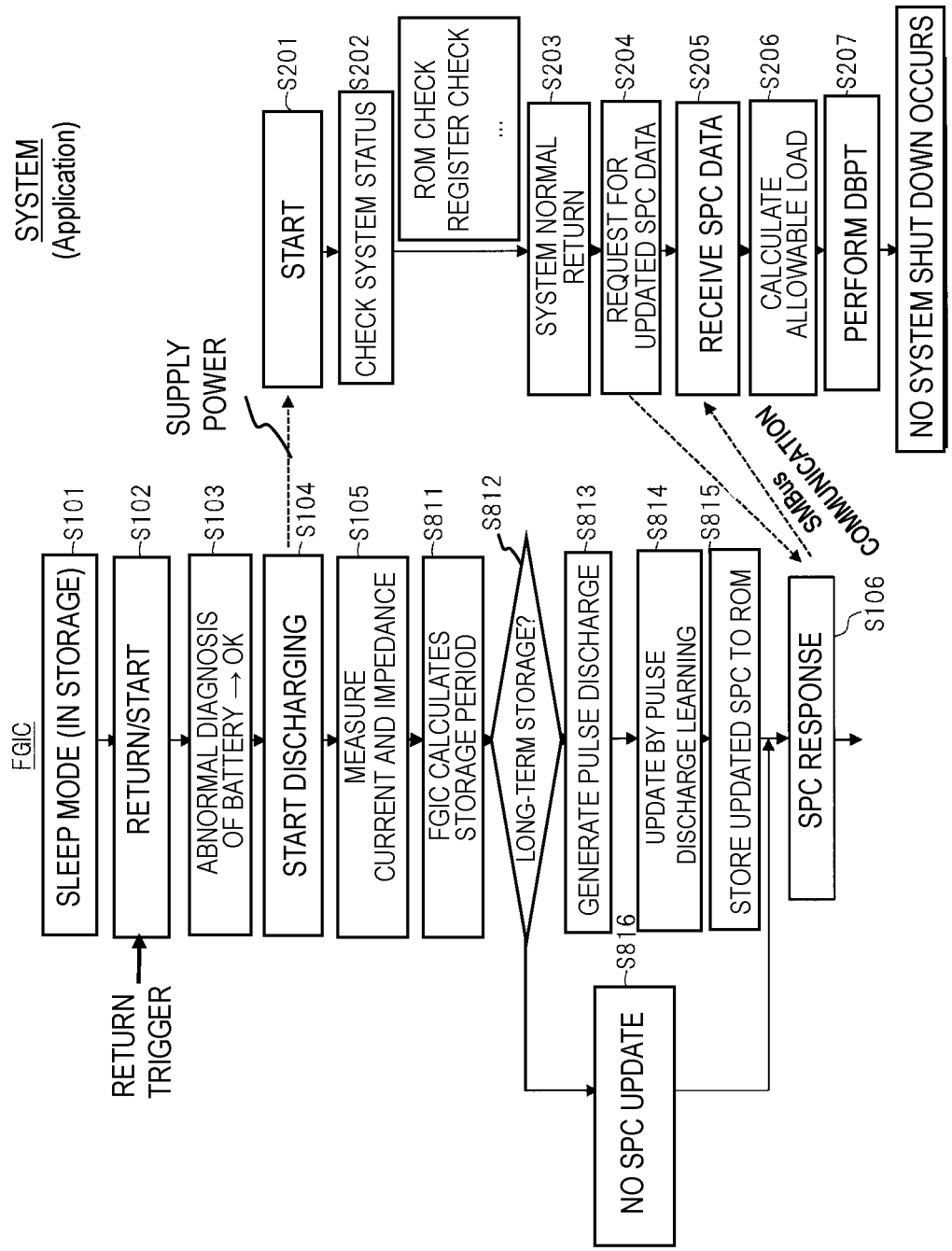
FIG. 13 illustrates an example of process at the time of system startup according to an eighth embodiment

FIG. 13 illustrates an example of process at the time of system startup according to the eighth example. FIG. 13 is similar to FIG. 2, etc., but differs from FIG. 2, etc., in the process between step S105 and step S106. In the present embodiment, as shown in FIG. 13, the process of step S811~S816 is performed after step S105 and prior to step S106.

In step S811, the charge/discharge controller 27 calculates a sleep period of the battery pack 100. The process of step S811 is the same as that of step S310 of FIG. 5, and therefore detailed descriptions thereof are omitted.

In step S812, the charge/discharge controller 27 determines whether or not the sleep period from the time when the battery pack 100 enters the sleep mode to the time when the battery pack 100 returns to the sleep mode is the long-term storage state. The process of step S812 is the same as that of step S211 of FIG. 4, and therefore detailed descriptions thereof are omitted. When the charge/discharge controller 27 determines that the battery pack 100 has been stored for a long period of time (Yes), the charge/discharge controller 27 supplies a discharge pulse generation signal to the discharge transistor 51 to generate a pulse discharge signal (Step S813). Then, the charge/discharge controller 27 performs a pulse discharge learning process using the current value at the time of pulse discharge measured by the current value measuring unit 21, calculates a power supply capability value for updating (step S814), and updates the ROM 25 power supply capability value 25c to the calculated value (step S815). As described above, in the present embodiment, the pulse-discharge learning process is performed under the initiative of the battery pack 100.

On the other hand, in step S812, when the charge/discharge controller 27 determines that the battery pack 100 is not in the long-term storage condition (NO), the charge/discharge controller 27 ends the power supply capability value update process without updating the power supply capability value 25c stored in the ROM 25 (step S816).

Although FIG. 13 shows an example in which the pulse discharge learning process is performed only when the battery pack 100 is in the long-term storage state, the pulse discharge learning process may be performed regardless of the length of the storage period. In this instance, the S811~S812 of steps in FIG. 13 is omitted.

In the pulse discharge learning process, the load may be switched on the system side.

According to the present embodiment, when the battery pack 100 is returned to the sleep mode, the pulse discharge learning process is performed only by the control in the battery pack 100, and the power supply capability value 25c of the ROM 25 is updated. According to this configuration, it is possible to update the power supply capability value to an appropriate value without cooperating with the system.

According to the present embodiment, the pulse discharge learning process is performed only when the battery pack 100 are stored for a long period of time. According to this configuration, the number of times of execution of the pulse release learning process is reduced, and the load on the battery cell 10 is reduced.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
a control unit configured to control charging and discharging of a battery cell; and
a ROM configured to store a power supply capability value defining a power supply capability of the battery cell that can be stably supplied to an application system,
wherein, after the battery pack returns from a sleep mode and before the battery pack receives a transmission request of the power supply capability value from the application system, the control unit performs a power supply capability value updating process for updating the power supply capability value of the ROM to a value smaller than the power supply capability value before the sleep mode.

2. The semiconductor device according to claim 1, wherein the semiconductor device is provided in the battery pack, and the battery pack is provided in the application system.

3. The semiconductor device according to claim 2, wherein, in the power supply capability value updating process, the control unit performs a storage period determining process for determining whether or not a sleep period from when the battery pack enters into the sleep mode to when the battery pack returns is equal to or greater than a sleep period determination threshold, and when the control unit determines the sleep period is equal to or greater than the sleep period determining threshold, the control unit updates the power supply capability value stored in the ROM.

4. The semiconductor device according to claim 3, further comprising:
a timer configured to measure the sleep period, and the control unit performs the storage period determination process using the sleep period measured by the timer.

5. The semiconductor device according to claim 3, wherein the control unit calculates the sleep period using a time at which the battery pack enters the sleep mode and a time at which the battery pack returns from the sleep mode.

6. The semiconductor device according to claim 5, wherein the control unit receives a time when the battery pack returns from the sleep mode from the system.

7. The semiconductor device according to claim 3, wherein the control unit sets the sleep period determination threshold based on the number of times of charging and discharging of the battery cell.

8. The semiconductor device according to claim 1, wherein, in the power supply capability value updating process, the control unit calculates a first update value smaller than the power supply capability value before the sleep mode by multiplying the power supply capability value in the ROM by a predetermined value, and updates the power supply capability value to the first update value.

9. The semiconductor device according to claim 2, wherein the control unit performs the power supply capability updating process using internal resistances of a power supply path of the battery pack before and after the sleep mode.

10. The semiconductor device according to claim 9, wherein, in the power supply capability value updating process, the control unit
calculates a ratio of a total value of an internal resistance of the battery pack and an internal resistance of the system before the sleep mode, to a total value of an internal resistance of the battery pack and an internal resistance of the system after the sleep mode as a resistance ratio,
calculates a second update value smaller than the power supply capability value before the sleep mode by multiplying the power supply capability value in the ROM by the resistance ratio, and
updates the power supply capability value of the ROM to the second update value.

11. The semiconductor device according to claim 2, further comprising:
a temperature sensor for measuring the temperature of the battery pack;
wherein, in the power supply capability value updating process, the control unit performs a storage temperature determination process for determining whether or not an average temperature of the battery pack during the sleep period measured by the temperature sensor is equal to or greater than a temperature determination threshold, and in the storage temperature determination process, the control unit updates the power supply capability value in the ROM when the average temperature is equal to or greater than the temperature determination threshold.

12. The semiconductor device according to claim 11, wherein, before the storage temperature determination process, the control unit performs storage period determination process for determining whether or not a sleep period from when the battery pack enters into the sleep mode to when the battery pack returns is equal to or greater than a sleep period determination threshold, and in the storage period determination process, the control unit performs the storage temperature determination process when it is determined that the sleep period is equal to or greater than the sleep period determination threshold.

13. The semiconductor device according to claim 11, wherein the temperature sensor measures a temperature of the battery pack at predetermined at predetermined interval.

14. The semiconductor device according to claim 2, wherein, when the control unit performs a pulse discharge learning process which updates the power supply capability value in the ROM by using current values of the battery pack when a load fluctuates before performing the power supply capability value updating process, the control unit does not perform the power supply capability value updating process.

15. The semiconductor device according to claim 1, wherein the power supply capability value is a current value of a power supply capable of being stably supplied to the system for a predetermined period.

16. A battery pack comprising:
   a semiconductor device configured to perform charge and discharge control of a battery cell; and
   a forced discharge circuit configured to generate a discharge pulse by short-circuiting a positive end portion and a negative end portion of the battery cell;
   wherein the semiconductor device comprises:
   a controller configured to control charge and discharge of the battery cell;
   a ROM configured to store a power supply capability value defining a power supply capability of the battery cell which can stably supply the power supply to an application system in which the battery cell is provided; and
   a discharge pulse generation signal generation circuit configured to generate a discharge pulse generation signal which turns on the forced discharge,
   wherein, after returning from a sleep mode and before receiving a request for transmission of the power supply capability value from the system, the forced discharge circuit generates the discharge pulse by providing the discharge pulse generation signal with the forced pulse generation signal, and
   wherein the controller performs a pulse learning process for updating the power supply capability value in the ROM by using a current value at the time of generation of the discharge pulse.

17. The battery pack according to claim 16, wherein the controller performs a storage period determination process for determining whether or not a sleep period from when the battery pack enters into the sleep mode to when the battery pack returns is equal to or greater than a sleep period determination threshold, when the controller determines that the sleep period is equal to or greater than the sleep period determination threshold, the controller performs the pulse discharge learning process.

* * * * *